(12) United States Patent
Glickman et al.

(10) Patent No.: US 10,507,769 B1
(45) Date of Patent: Dec. 17, 2019

(54) VEHICLE WITH FRONT TRUNK

(71) Applicant: FORD GLOBAL TECHNOLOGIES, LLC, Dearborn, MI (US)

(72) Inventors: David Brian Glickman, Southfield, MI (US); Stuart C. Salter, White Lake, MI (US); Paul Kenneth Dellock, Northville, MI (US); Mark A. Wisneski, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/173,188

(22) Filed: Oct. 29, 2018

(51) Int. Cl.
*B60R 5/02* (2006.01)
*B60R 9/06* (2006.01)
*B60Q 3/74* (2017.01)
*B60Q 3/30* (2017.01)

(52) U.S. Cl.
CPC ............... *B60R 9/065* (2013.01); *B60Q 3/30* (2017.02); *B60Q 3/74* (2017.02)

(58) Field of Classification Search
CPC ......... B60R 11/06; B60R 9/065; B60R 5/041; B60R 9/06; B60R 19/14; B60R 2011/0082; B60R 2011/0084; B60R 2011/0085; B60Q 3/30
USPC ....... 224/496, 489, 491, 502, 509, 281–282; 362/459, 464, 484, 523; 296/26.09
See application file for complete search history.

(56) References Cited

U.S. PATENT DOCUMENTS

| | | | | |
|---|---|---|---|---|
| 2,576,385 | A * | 11/1951 | Bigsby | B60R 5/041 224/496 |
| 2,784,027 | A * | 3/1957 | Temp | B60P 3/32 296/156 |
| 4,375,306 | A * | 3/1983 | Linder | B60P 3/32 108/44 |
| 4,469,364 | A * | 9/1984 | Rafi-Zadeh | B60R 11/06 224/404 |
| 4,705,315 | A * | 11/1987 | Cherry | B60R 11/06 296/24.45 |
| 8,562,058 | B1 | 10/2013 | Kim et al. | |
| 8,844,779 | B2 * | 9/2014 | Cha | B60R 3/02 224/491 |
| 8,925,777 | B1 * | 1/2015 | Casucci | B60R 9/065 224/404 |
| 9,789,823 | B2 * | 10/2017 | Salter | B60R 7/02 |
| 9,863,621 | B2 * | 1/2018 | Dai | B62D 25/12 |
| 2009/0021357 | A1 | 1/2009 | Evans et al. | |
| 2011/0031771 | A1 * | 2/2011 | Ding | B60R 5/02 296/24.4 |

FOREIGN PATENT DOCUMENTS

| | | |
|---|---|---|
| CN | 202557425 U | 11/2012 |
| CN | 104586097 A | 5/2015 |
| CN | 102910111 B | 12/2015 |

(Continued)

*Primary Examiner* — Adam J Waggenspack
(74) *Attorney, Agent, or Firm* — Vichit Chea; MacMillan, Sobanski & Todd, LLC

(57) ABSTRACT

A vehicle includes a front trunk between fenders, a grille movable to provide an opening to the front trunk, and front and rear bins, slidable out of the front trunk to allow the front bin to pivot on the rear bin. A light is mounted on the front bin such that light projects into the front and rear bins when adjacent and only into the front bin when the front bin is pivoted away.

15 Claims, 4 Drawing Sheets

(56) References Cited

FOREIGN PATENT DOCUMENTS

| | | |
|---|---|---|
| CN | 106882152 A | 6/2017 |
| CN | 207045245 U | 2/2018 |
| GB | 817201 A | 7/1959 |
| JP | 2016055654 A | 4/2016 |

* cited by examiner

US 10,507,769 B1

VEHICLE WITH FRONT TRUNK

BACKGROUND OF THE INVENTION

The present invention relates to a vehicle having a front trunk and more particularly to user access to the trunk.

Some vehicles include a front trunk, which may be due to the engine being located other than under a hood at the front of the vehicle, or due to the vehicle operating as a battery electric, in which case there is no engine under the hood.

In particular vehicle models, there may be customer options for an engine-based powertrain (gasoline, diesel, etc.), a hybrid electric powertrain or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. Ease of access to this front trunk area is desirable.

SUMMARY OF THE INVENTION

An embodiment contemplates a vehicle including a front trunk between fenders, a grille movable to provide an opening to the front trunk, front and rear bins, slidable out of the front trunk to allow the front bin to pivot on the rear bin, and a light mounted on the front bin such that light projects into the front and rear bins when adjacent and only into the front bin when the front bin is pivoted away.

An embodiment contemplates a method of operating a storage assembly in a front trunk of a vehicle comprising: activating a bin light mounted on a front bin that directs light into the front bin and an adjacent rear bin; sliding the front and rear bins forward relative to the front trunk; and pivoting the front bin away from the rear bin while increasing intensity of light emitted from the bin light.

An advantage of an embodiment is that essentially the same vehicle structure and front end look may be employed for various drivetrain configurations of a vehicle, while providing ease of access to a front trunk for a battery electric powertrain configuration of the vehicle. The ease of access to the front trunk is provided while providing features that add to the functionality of the front trunk, such as lighting and movable storage bins.

DETAILED DESCRIPTION

Figure 1:
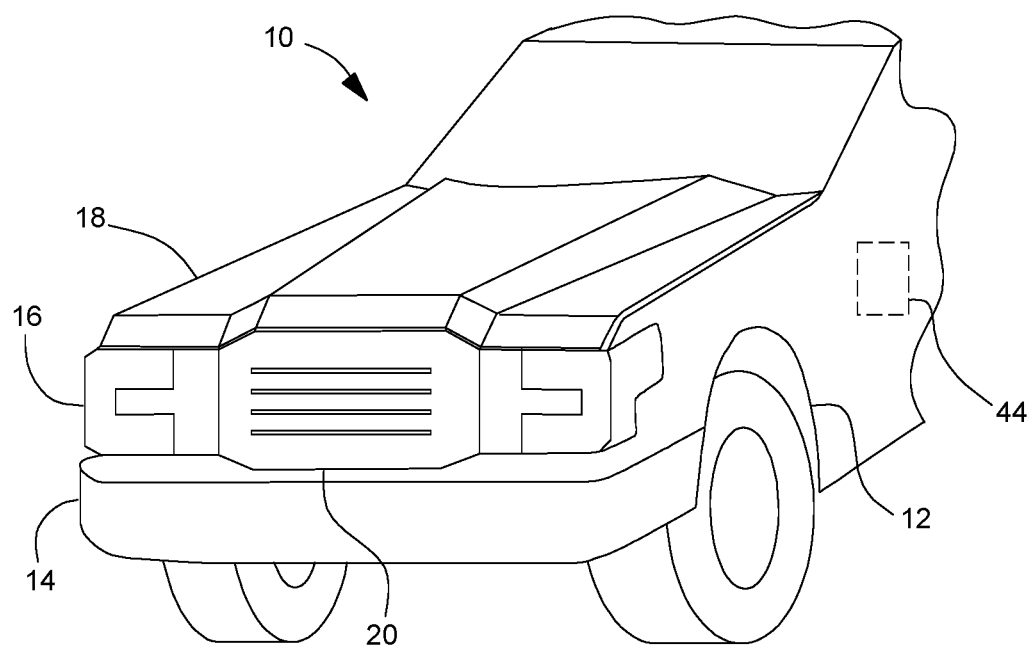
FIG. 1 is a schematic perspective view of a front end of a vehicle showing a hood in a closed position.
Figure 2:
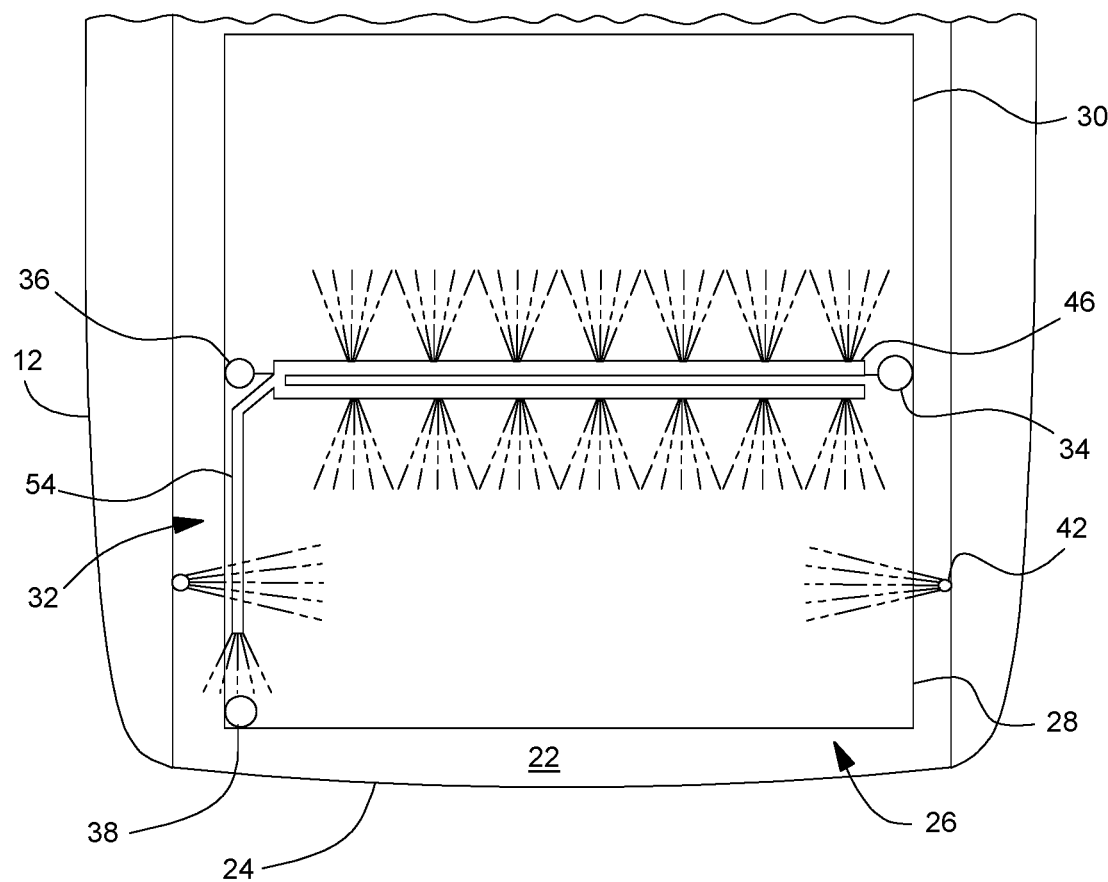
FIG. 2 is a schematic plan view of storage assembly in a vehicle front trunk, with bins of the storage assembly retracted.
Figure 3:
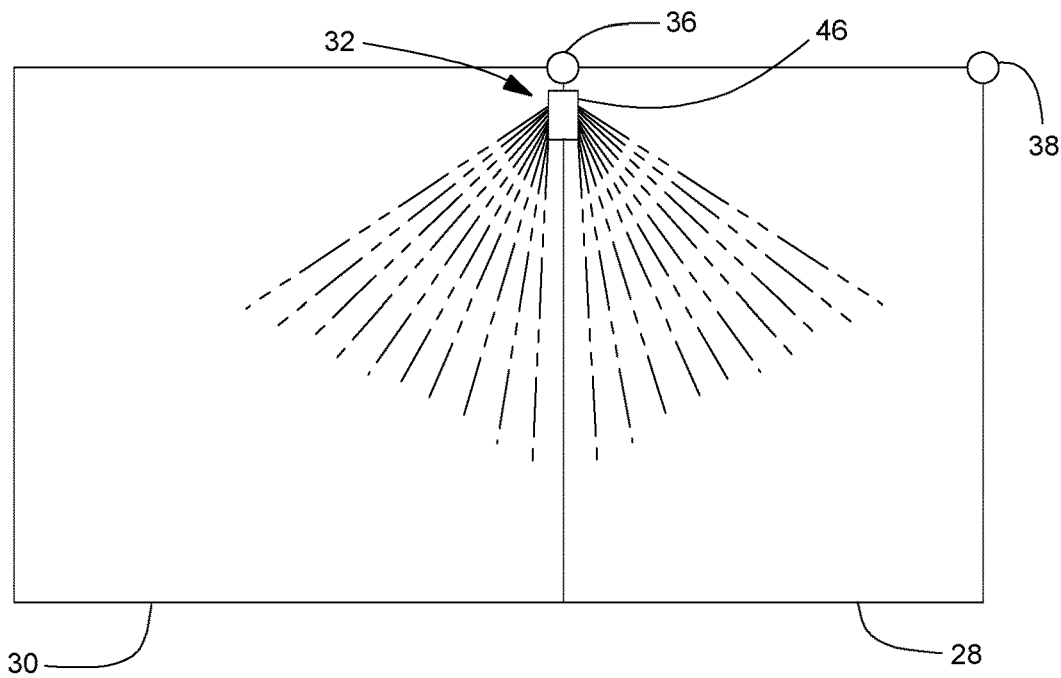
FIG. 3 is a schematic side view within the bins of the storage assembly.
Figure 4:
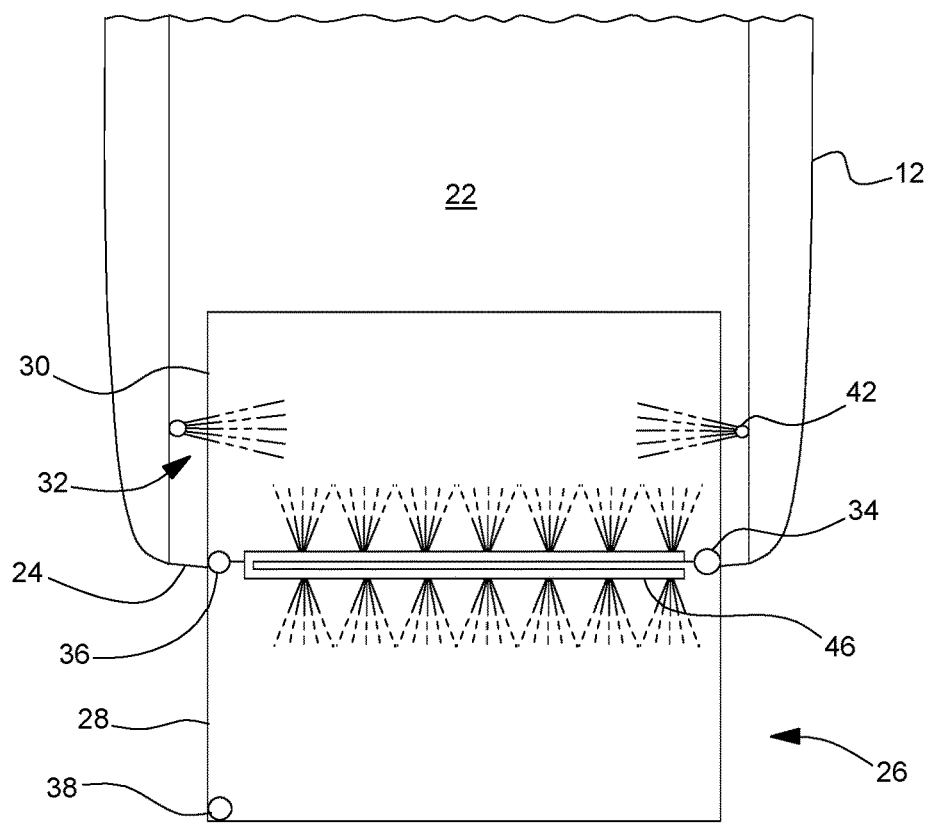
FIG. 4 is a schematic plan view similar to FIG. 2 but with the bins partially extended from the front trunk.
Figure 5:
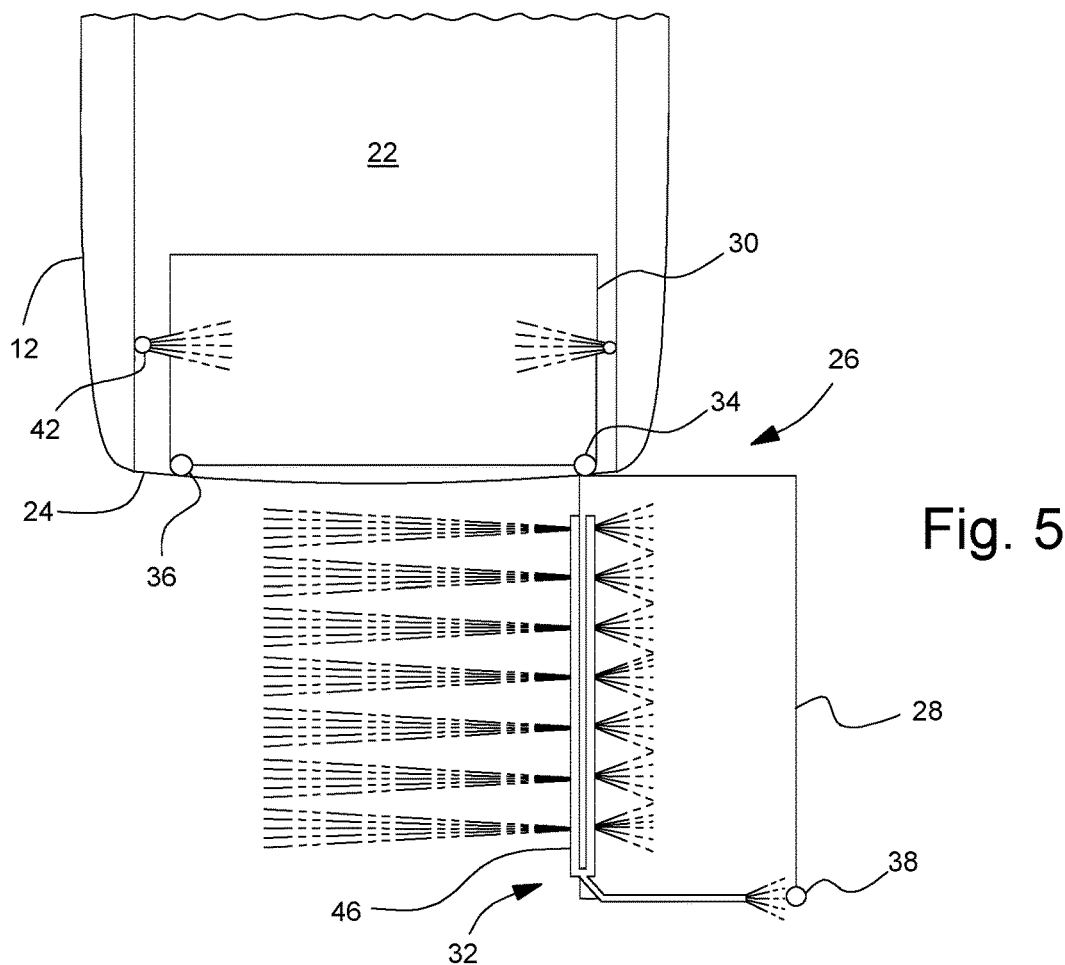
FIG. 5 is a schematic plan view similar to FIG. 4 but with the storage assembly further extended from the front trunk.

FIGS. 1-6 illustrate a vehicle 10 having front fenders 12, a front bumper 14, headlights 16, a hood 18 and a grille 20. The vehicle 10 may be a pickup truck, although it may be a different type of vehicle if so desired.

The grille 20 may be sized and shaped to match a grille in an engine driven model of this vehicle in order to maintain the same look and allow for essentially the same front end vehicle body structure for both models. While the grille 20 may be configured to look the same as other models from outside of the vehicle 10, it may have a solid inner surface in order to keep water out of a front trunk 22 and provide other functionality. The solid inner surface may be feasible in this battery electric vehicle 10, rather than having perforations or openings, since no air flow is needed for engine cooling. When the front trunk 22 is open, the grille 20 moves out of the way of a front opening 24 of the front trunk 22, which allows for access to a storage assembly 26.

The storage assembly 26 includes movable front 28 and rear 30 bins and a lighting system 32 that fit within the front trunk 22 when the hood 18 and grille 20 are closed.

The bins 28, 30 are configured to slide forward from a retracted position (see FIG. 2) to an extended position (see FIG. 4) by one pulling on a handle 38. In the extended position, the front bin 28 extends forward from the vehicle 10, while the rear bin 30 remains generally supported within the front trunk 22.

The bins 28, 30 are releasably secured together by a pivot 34 on one side and a latch 36 on the other. The pivot 34 allows the front bin 28 to pivot about a vertical axis relative to the rear bin 30 when the latch 36 is released (see FIG. 5). By pivoting the front bin 28, one has ease of access to both bins 28, 30. The ability to selectively pivot the front bin 28 relative to the rear bin 30 also provides additional convenience features relating to the lighting system 32.

The lighting system 32 may include front trunk mounted lights 42 that are in fixed positions relative to the front trunk 22, with these lights generally directing light laterally within the front trunk 22, without regard to the position of the bins 28, 30. The direction of light emanating from the various light sources herein is illustrated with phantom lines (in FIGS. 2-6) in order to provide an orientation of the lighting as well as the areas that are lit by the light sources. Additionally, the lighting system 32 may be controlled by a controller 44, which may be a separate controller or may be part of another vehicle controller such as a body controller. The lighting system 32 may be controlled by the controller 44 and actuated in coordination with the hood position.

The lighting system 32 also includes bin-mounted lighting 46 that is mounted on the front bin 28. This lighting 46 may, for example, include an acrylic shell that extends along the rear of the front bin 28, with a printed circuit board (PCB) and light emitting diodes (LEDs) mounted within the shell. The bin-mounted lighting 46 is oriented to project light down into both bins 28, 30, as can be seen by the direction of the light (shown in phantom in FIGS. 2-4). Since the bin-mounted lighting 46 is mounted on the front bin 28, they move with the bins 28, 30 as the bins 28, 30 are pulled from the retracted position to the extended position. This assures that the bins 28, 30 are well lit in both positions. Also, a light pipe 54 (shown in FIG. 2) may be employed to direct some of the light from the bin-mounted lighting 46 to the latch 36 and the handle 38.

The bin-mounted lighting 46 also provides an additional lighting feature when the front bin 28 is pivoted away from the rear bin 30. After the latch 36 is released and the front bin 28 begins to pivot, the bin-mounted lighting 46 pivots with the front bin 28, thus changing the orientation of the lighting 46 (see FIG. 5). The light that used to shine into the rear bin 30 now shines down into the space between the two bins 28, 30, providing general lighting for one inserting/removing items from the bins 28, 30. To account for the bin-mounted lighting 46 no longer being directed into the rear bin 30, the front trunk mounted lights 42 may be increased in intensity, if so desired. This detection of the front bin 28 being pivoted away from the rear bin 30 may be accomplished via a contact switch in the latch or other sensing means.

As for activating the lighting in the front trunk 22, the lighting system 32 may be turned on by a switch that detects the hood 18 moving from a closed position. Additionally, the lighting may be controlled by a keypad or touch screen on the exterior of the vehicle 10, a key fob, vehicle interior button or touch screen, remote cellular device such as a phone, etc.

Figure 6:
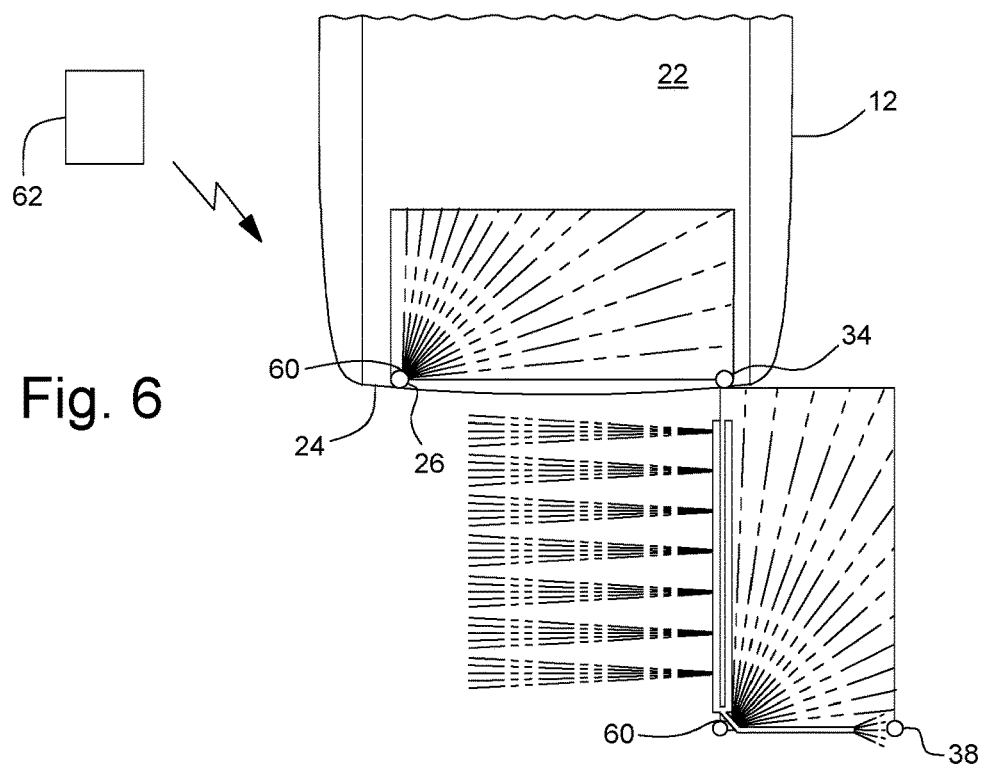
FIG. 6 is a schematic plan view similar to FIG. 5 but with proximity sensors shown activated.

FIG. 6 shows proximity sensors 60 activated in the bins 29, 30 of the storage assembly 26. The sensors 60 may be, for example, infrared sensors. The sensors 60 may be in communication with the controller 44 and detect when someone reaches into either of the bins 28, 30. This may be employed, for example, in combination with a key fob 62 (or smart phone) that is also in communication (directly or indirectly) with the controller 44. When the proximity sensor system is activated, if a proximity sensor 60 detects someone reaching into one of the bins 28, 30 and the key fob 62 (or smart phone as the case may be) is detected close by, then no alarm is set off. But, if someone reaches into one of the bins 28, 30 and the key fob (smart phone) is not close by, then an alarm is activated to indicate unauthorized access to the bins 28, 30.

Figure 7:
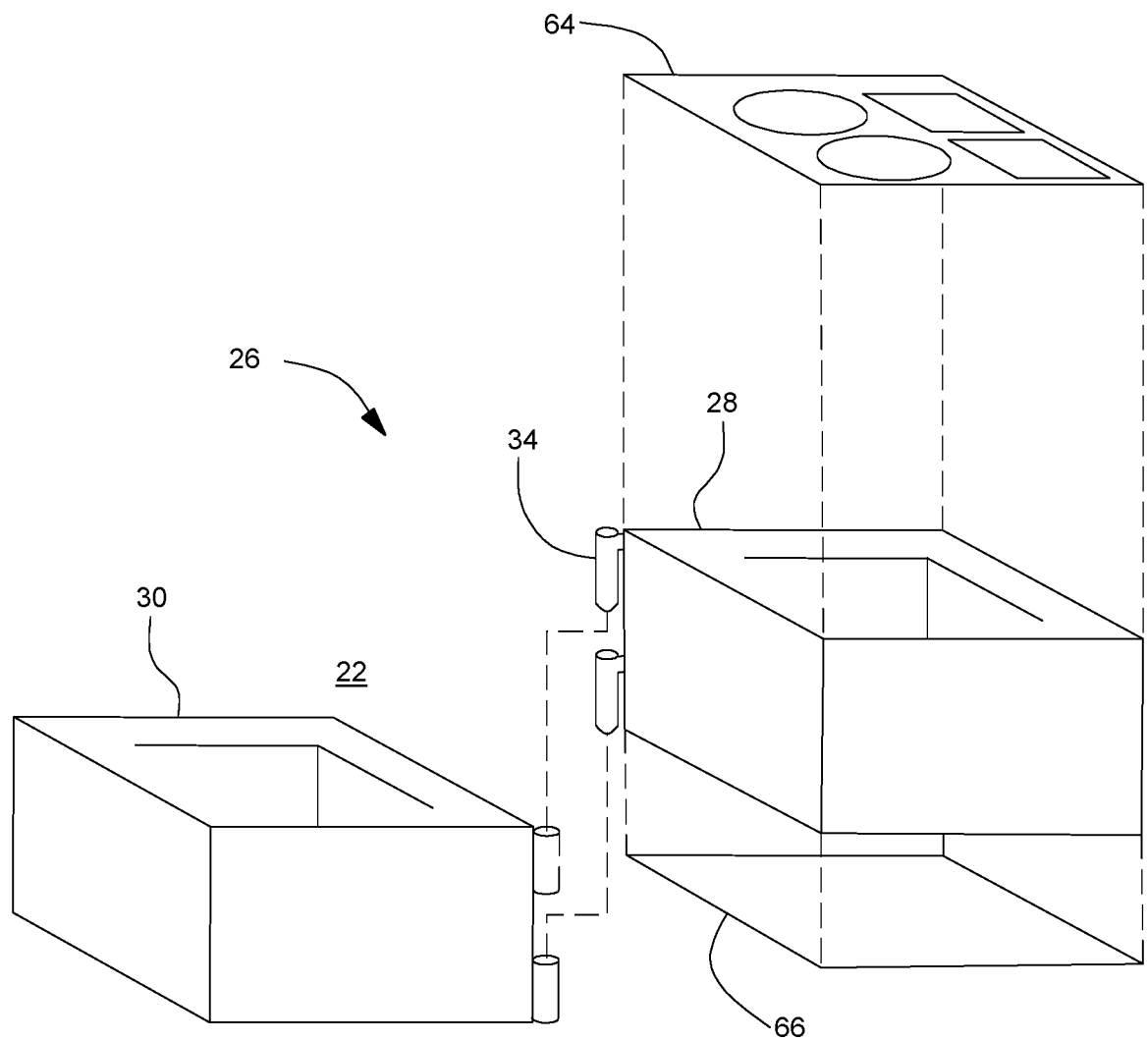
FIG. 7 is a schematic, exploded, perspective view of a storage assembly having inserts and floor illumination.

FIG. 7 illustrates a storage assembly 26 having a divider insert 64 that fits in the front bin 28 to provide better support for items stored in the front trunk 22. Additionally, the front bin 28 (and also the rear bin 30 if so desired) may include a light source 66 in the floor of the bin 28 to provide an upward projecting light to illuminate the bin 28, while still allowing for the front bin 28 to pivot about the pivots 34 relative to the rear bin 30.

While certain embodiments of the present invention have been described in detail, those familiar with the art to which this invention relates will recognize various alternative designs and embodiments for practicing the invention as defined by the following claims.

The invention claimed is:

1. A vehicle comprising:
a front trunk between fenders;
a grille movable to provide an opening to the front trunk;
front and rear bins, slidable out of the front trunk to allow the front bin to pivot on the rear bin; and
a light mounted on the front bin such that light projects into the front and rear bins when adjacent and only into the front bin when the front bin is pivoted away.

2. The vehicle of claim 1 further including a latch to selectively prevent the front bin from pivoting relative to the rear bin.

3. The vehicle of claim 1 further including a handle mounted to a front of the front bin and a light pipe extending from the light to the handle.

4. The vehicle of claim 1 further including a fender mounted light directing light into the front trunk.

5. The vehicle of claim 1 further including a proximity sensor, mounted on one of the front and rear bins, configured to detect a person reaching into the respective bin.

6. The vehicle of claim 5 further including a controller configured to detect how far a key fob is from the vehicle when the proximity sensor detects the person reaching into the respective bin.

7. The vehicle of claim 1 further including a light source forming a floor of the front bin and directed light upward through the front bin.

8. The vehicle of claim 1 including a controller configured to increase intensity of the light mounted on the front bin when the front bin is pivoted away from the rear bin.

9. A method of operating a storage assembly in a front trunk of a vehicle comprising:
activating a bin light mounted on a front bin that directs light into the front bin and an adjacent rear bin;
sliding the front and rear bins forward relative to the front trunk; and
pivoting the front bin away from the rear bin while increasing intensity of light emitted from the bin light.

10. The method of claim 9 further including:
moving a grille away from an opening of the front trunk before sliding the front and rear bins forward.

11. The method of claim 9 further including:
directing light from the bin light through a light pipe to a handle on a front side of the front bin.

12. The method of claim 9 further including:
employing a proximity sensor mounted on one of the front and rear bins to detect when a person reaches into the respective bin.

13. The method of claim 12 further including:
detecting how far a key fob is from the vehicle when the proximity sensor detects the person reaching into the respective bin.

14. The method of claim 9 further including:
increasing intensity of the bin light when the front bin is pivoted away from the rear bin.

15. The method of claim 14 further including:
increasing intensity of a fender mounted light directing light into the front trunk when the front bin is pivoted away from the rear bin.

* * * * *